Patented Aug. 11, 1942

2,292,551

UNITED STATES PATENT OFFICE 2,292,551

NAPHTHOSTYRIL-5-CARBOXYLIC ACID

Frederic B. Stilmar, Woodstown, N. J., assignor to E. I. du Pont de Nemours & Company, Wilmington, Del., a corporation of Delaware No Drawing. Application January 26, 1940,
Serial No. 315,757

1 Claim. (Cl. 260—313)

This invention relates to the preparation of new organic compounds, and more particularly to the preparation of anthanthrone-3,8-dicarboxylic acid and the intermediate compounds employed in its preparation.

I have found that anthanthrone-3,8-dicarboxylic acid of the formula

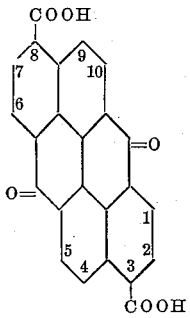

may be prepared in relatively pure form and in good yields starting with 1,4-naphthalene dicarboxylic acid. According to this process 1,4-naphthalene-dicarboxylic acid is nitrated to give 5-nitro-1,4-naphthalene-dicarboxylic acid of high purity and in high yields. This compound is then reduced to naphthostyril-5-carboxylic acid with hydrogen in the presence of a nickel catalyst. Since no isomeric compounds are formed a very high yield of the naphthostyril-5-carboxylic acid of very pure form is obtained. The naphthostyril-5-carboxylic acid is then hydrolyzed, diazotized and treated with ammoniacal cuprous oxide to give 1,1'-dinaphthyl-5,8-5',8'-tetracarboxylic acid which may be ring closed with sulfuric acid to the anthanthrone-3,8-dicarboxylic acid.

The intermediates produced in the above reaction as well as the final product are new compounds. The 5-nitro-1,4-naphthalene-dicarboxylic acid and the naphthostyril-5-carboxylic acid are valuable dyestuff intermediates not only for the preparation of anthraquinone vat dyes but also for the preparation of azo colors, since the naphthostyril-5-carboxylic acid when hydrolyzed and diazotized may be coupled with the usual components to give azo dyes which may be metallized if desired.

The following examples more fully illustrate the invention. The parts used are by weight.

Example 1

50 parts of 1,4-naphthalene dicarboxylic acid are gradually added with efficient agitation, keeping the temperature below 15° C., to 100 parts of fuming nitric acid. After addition, the temperature is maintained at 25-30° C. for one hour. The reaction mass is then drowned in ice water, filtered, and the residue comprising 5-nitro-1,4-naphthalene dicarboxylic acid is washed and dried. It has a melting point of 270.5° C. Analysis shows a nitrogen content of 5.55% and the presence of two carboxylic acid groups. It has the formula

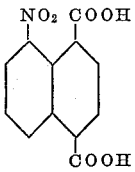

Example 2

53.3 parts of 5-nitro-1,4-naphthalene dicarboxylic acid, 5 parts of calcium carbonate, 10.8 parts of nickel catalyst and 640 parts of methanol are heated in a hydrogenation autoclave to 85-90° C. A hydrogen pressure of 500 pounds is maintained for four hours. The alcohol is then removed by distillation, and the product extracted with dilute hydrochloric acid. The naphthostyril-5-carboxylic acid is then dissolved in alkali and reprecipitated with hydrochloric acid. It shows a melting point of 374° C. with decomposition, and has the formula

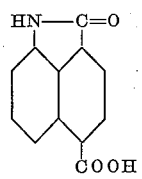

Example 3

63.9 parts of naphthostyril-5-carboxylic acid, 72 parts of sodium hydroxide and 1200 parts of water are heated to boiling for several hours. The solution is then slowly dropped into 240 parts water while maintaining the temperature at 5-10° C. Simultaneously there is dropped in 720 parts concentrated hydrochloric acid so that a test is always acid to Congo Red paper. At the same time, there is dropped in as rapidly as taken up a solution of 21 parts of sodium nitrite and 120 parts water. The diazonium salt which is precipitated is filtered off and washed with cold water.

A cuprous oxide solution is prepared as follows: 210 parts of copper sulfate, 66 parts of sodium chloride in 1050 parts water are heated to 60-65° C. and sulfur dioxide passed in until precipitation of the cuprous chloride is complete. The cuprous chloride is washed by decantation and then added to a solution of 36 parts of sodium hydroxide in 600 parts water. After stirring for a few minutes, the cuprous oxide was filtered off, washed and then added to a solution of 150 parts concentrated ammonia and 300 parts water.

The diazonium cake is now slurried in cold water, and added gradually to the above cuprous oxide solution, keeping the temperature at 10–20° C. After heating a few minutes, the crude 1,1'-dinaphthyl-5,8-5',8'-tetracarboxylic acid is precipitated with hydrochloric acid, and filtered off. Purification is effected by extracting with magnesium oxide in water to form the soluble magnesium salt of the 1,1'-dinaphthyl-5,8-5',8'-tetracarboxylic acid. After filtering the free acid is precipitated by acidifying the filtrate.

*Example 4*

42 parts of 1,1'-dinaphthyl-5,8-5',8'-tetracarboxylic acid and 420 parts of sulfuric acid monohydrate are heated at 80-85° for one hour. Ring-closure with the formation of anthanthrone-3,8-dicarboxylic acid is accompanied by the development of a green solution color. The anthanthrone-3,8-dicarboxylic acid is isolated by drowning in water and filtering. It is a red powder, and is soluble in sulfuric acid with a green coloration. It is readily soluble in dilute alkali, and upon addition of sodium hydrosulfite gives a reddish-blue solution.

The anthanthrone-3,8-dicarboxylic acid is readily converted to the corresponding di-acid-chloride which may be employed as a component in the preparation of acidyl-aminoanthraquinone dyestuffs. It also serves as an intermediate for the preparation of the ketones of anthanthrone such as dibenzoyl anthanthrone or in the preparation of esters and acid amines of anthanthrone.

I claim:

The process which comprises nitrating 1,4-naphthalene dicarboxylic acid and reducing the resulting nitro compound with hydrogen in the presence of a nickel catalyst to naphthostyril-5-carboxylic acid.

FREDERICK B. STILMAR.